March 16, 1926.
H. A. BUTLER
1,577,104
CARPENTER'S GAUGE AND SCALE
Filed March 14, 1923
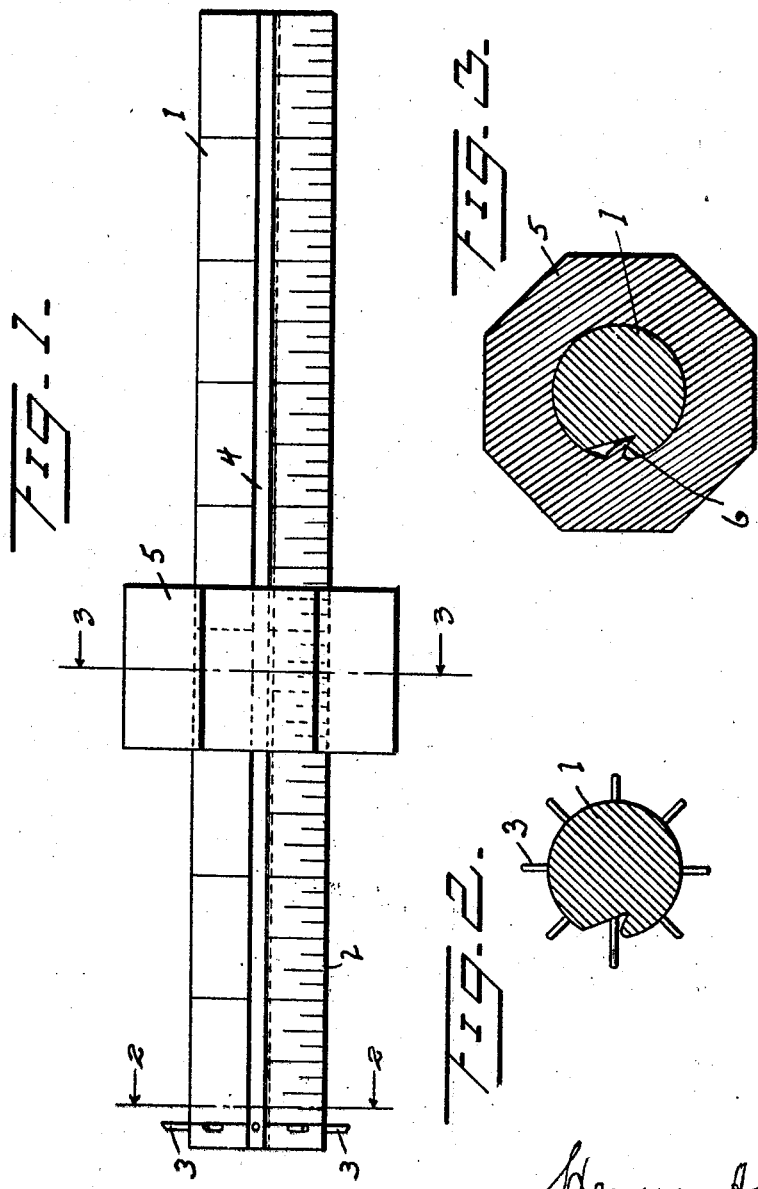
Inventor
Henry. A. Butler Patented Mar. 16, 1926.

1,577,104

UNITED STATES PATENT OFFICE.

HENRY A. BUTLER, OF TORONTO, ONTARIO, CANADA.

CARPENTER'S GAUGE AND SCALE.

Application filed March 14, 1923. Serial No. 625,062.

*To all whom it may concern:*

Be it known that I, HENRY A. BUTLER, a subject of the King of England, residing at Toronto, in the Province of Ontario and Dominion of Canada, have invented certain new and useful Improvements in Carpenters' Gauges and Scales, of which the following is a specification.

This invention relates to an improved carpenter's marking gauge or scale, and has for its prime object to provide a device of this character, which can be easily adjusted and locked into position, without the use of set screws or fastening means of any description.

In order to accomplish the above object, a cylindrical shaft of any length is used, which is provided with a graduated scale on one side, and a hexagonal shaped sliding gauge which is provided with an integral tongue for engagement with a groove formed in the circular shaft, said tongue and groove provided with cam surfaces adjacent each other, so that the tongue engages the groove to act as a guide for the hexagonal gauge and at the same time provides means whereby the hexagonal member may be securely locked in engagement with the circular shaft by a slight rotary movement which will bind the cam surfaces together at any desired adjustment on the said shaft.

A further object of the invention is to provide a carpenter's marking gauge and scale of the above indicated character, which is simple in construction and operation, durable, efficient for the purpose and one that can be manufactured and placed on the market at a relatively low cost.

These and like objects of the invention will be better understood as the description follows and as is specifically pointed out in the appended claim.

Referring to the accompanying drawing which forms a part of this specification and which clearly illustrates the construction and operation of my improved marking gauge and scale, Figure 1 is a side elevation of a marking gauge and scale constructed in accordance with my invention.

Figure 2 is a vertical section taken on line 2—2 of Figure 1, and

Figure 3 is a vertical section taken on line 3—3 of Figure 1.

Referring to the accompanying drawing in detail, like characters will be used to designate like parts in the different views.

In the drawing, the numeral 1 indicates a circular shaft which is provided on one side with a graduated scale as at 2, and a series of pins are inserted within the circular shaft 1 adjacent one end of same as indicated by the numeral 3.

The circular shaft 1 is provided with a groove 4 that extends the entire length of same, the purpose of which will be better understood as the description follows.

A gauge 5, which is provided with an interior circular opening to conform to the shape of the circular shaft 1 is positioned on the latter for sliding movement thereon. The exterior surface of the member 5 is hexagonal shaped, so as to afford an easy means by which the device as a whole may be moved towards and away from the operator of same, as in the act of marking a piece of lumber.

Heretofore, it has been customary to insert a set screw within the member 5, which would engage the shaft 1, for holding the member 5 at any desired adjustment. In this form of locking means, it has been found that quite often the set screw will become rusty and will not perform its proper function and that same also with constant use mars the member 1 and will not securely hold the sliding member 5 at the desired adjustments. In order to overcome these various objections, I have provided a tongue 6 formed integral on the interior opening of the member 5, said tongue having an abutment surface 6ª and a cam portion 6ᵇ which is adapted to engage the groove 4 of a similar shape to not only act as a guide for the member 5 thereon, but to also provide means for locking the member 5 at any desired adjustment, said locking being due to the binding of the two cam surfaces together.

For the purpose of illustrating the operation of my invention, it is assumed that it is desired to draw a mark on a board at three inches. The member 5 is then moved along the circular member 1 until the three inch mark is reached, after which the member 5 is given a slight rotary turn, which causes the tongue 6 to bind and grip within the groove 4, thus firmly holding the member at any locked position.

In view of the foregoing description of my invention, taken in connection with the accompanying drawing, it is thought that any further explanation as to the construction, operation, and objects of the invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

A gauge comprising a shaft having a cylindrical surface and provided at its side with a longitudinally disposed incut groove having opposite side wall surfaces which are angularly disposed with relation to each other, one of which is plane and the other curved transversely, a member having a circular opening which snugly receives the shaft, the surface of said opening being concentric with relation to the centers of the shaft and the member, said member being provided at one side of the opening with an inwardly disposed tongue having curved opposite side surfaces, one side surface of the tongue adapted to slidably engage the curved wall surface of the groove and the other side surface of the tongue adapted to frictionally engage the plane wall surface of the groove and a marking point carried by the shaft.

In testimony whereof, I have affixed my signature.

HENRY A. BUTLER.